United States Patent Office 3,053,652
Patented Sept. 11, 1962

3,053,652
Ni, Cr, Pd, Mn, Si BRAZING ALLOY
Paul R. Mobley and William R. Blackham, Cincinnati, Ohio, assignors to General Electric Company, a corporation of New York
No Drawing. Filed Mar. 11, 1960, Ser. No. 14,180
5 Claims. (Cl. 75—171)

This invention relates to brazing alloys and more particularly to a high temperature brazing alloy including the elements Ni—Cr—Pd—Mn and Si.

Certain of the high temperature nickel base superalloys, when fabricated into product components of articles, cannot be joined by brazing methods conducted at temperatures over 2000° F. For example one nickel base superalloy having the nominal composition in percent by weight of about 19 Cr, 5 Cb/Ta, 3 Mo, 0.6 Al, 0.8 Ti, 53 Ni with the balance essentially iron, when thermally cycled over 2000° F., is subject to such extremely rapid grain growth and solutioning that its strength is severely penalized and an irrecoverable loss of properties occurs. Thus the penalty for going over 2000° F. to braze together components made of such an alloy is so severe that either another material would have to be substituted or a lower brazing temperature material would have to be used.

One object of this invention is to provide a brazing alloy compatible with such nickel base superalloys and which can be brazed at a temperature below 2000° F.

Another object is to provide such a brazing alloy which has good flow characteristics, which wets superalloys well and which results in no erosion or intergranular penetration of the materials being brazed.

These and other objects will be better understood from the following detailed description when considered with the specific illustrative examples which are not meant to be limitations on this invention.

Briefly stated, the alloy of this invention in its broad form comprises in percent by weight about 10–20 chromium, about 5–15 palladium, about 10–40 manganese, about 1–5 silicon, with the balance essentially nickel.

The alloy of this invention has been found to have a maximum brazing temperature of about 1950° F. in vacuum and 2000° F. in hydrogen, and has excellent oxidation resistance below about 1800° F.

Co-pending application Serial Number 14,338, filed March 11, 1960, assigned to the assignee of this application, has shown that below about 15% by weight chromium in a Ni—Cr—Pd system including palladium up to about 35% by weight results in an alloy having poor resistance to deep oxidation penetration. However, this invention shows that the inclusion of about 10–40% by weight manganese in addition to the Ni, Cr, Pd and Si has produced a brazing alloy having a different set of metallurgical and physical properties, among them oxidation resistance. Therefore, the alloy of this invention can be used in applications for service at less than about 1800° F. The following table represents the alloy of this invention in its broad form as well as three additional preferred ranges. These alloys were prepared by non-consumable electrode melting in a vacuum purged helium atmosphere chamber.

*Percent by Weight (Balance Ni)*

|  | Cr | Pd | Mn | Si |
|---|---|---|---|---|
| Broad | 10–20 | 5–15 | 10–40 | 1–5 |
| Pd 28 | 15 | 15 | 18 | 4 |
| Pd 34 | 15 | 10 | 27 | 4 |
| Pd 30 | 15 | 15 | 25 | 5 |

All the alloys in the above table have maximum brazing temperatures in vacuum of about 1950° F., have good flow and wetting characteristics, do not erode nickel base superalloys nor cause intergranular penetration. Thus, they maintain the structural integrity of the materials being joined. No interface diffusion reaction occurs as it does with boron containing high temperature brazing alloys currently in use.

Another unique characteristic of the alloy of this invention is that its remelt temperature, after brazing, is substantially higher than is normal for most brazing alloys of this type. Such increase is achieved through the loss of manganese during brazing.

Impact type ductility tests have shown that the alloy of this invention is unusually strong yet ductile in comparison, for example, with Ni—Cr—Si—B or Ni—Cr—B types of high temperature brazing alloys currently in use.

Although this invention has been described in connection with specific examples it will be understood by metallurgists the variations and modifications of which the alloy of this invention is capable.

What is claimed is:

1. A high temperature brazing alloy having a brazing temperature below about 2000° F. consisting essentially of about 10–20 chromium, about 5–15 palladium, about 10–40 manganese, about 1–5 silicon, with the balance essentially nickel.

2. A high temperature brazing alloy having a brazing temperature below about 2000° F. consisting essentially of about 15 chromium, about 10–15 palladium, about 18–27 manganese, about 4–5 silicon, with the balance essentially nickel.

3. A high temperature brazing alloy having a brazing temperature below about 2000° F. consisting essentially of about 15 chromium, about 15 palladium, about 18 manganese, about 4 silicon, with the balance essentially nickel.

4. A high temperature brazing alloy having a brazing temperature below about 2000° F. consisting essentially of about 15 chromium, about 10 palladium, about 27 manganese, about 4 silicon, with the balance essentially nickel.

5. A high temperature brazing alloy having a brazing temperature below about 2000° F. consisting essentially of about 15 chromium, about 15 palladium, about 25 manganese, about 5 silicon, with the balance essentially nickel.

References Cited in the file of this patent

UNITED STATES PATENTS

| 2,133,291 | Gordon | Oct. 18, 1938 |
| 2,226,076 | Rutledge | Dec. 24, 1940 |
| 2,226,079 | Spanner | Dec. 24, 1940 |
| 2,815,282 | Rhodes et al. | Dec. 3, 1957 |
| 2,856,281 | Cremer et al. | Oct. 14, 1958 |
| 2,872,309 | Bolkcom et al. | Feb. 3, 1959 |
| 2,900,251 | Evans et al. | Aug. 18, 1959 |
| 2,923,621 | Hoppin | Feb. 2, 1960 |

FOREIGN PATENTS

| 373,725 | Germany | Apr. 14, 1923 |
| 707,078 | Great Britain | Apr. 14, 1954 |